June 4, 1963  J. N. SCOTT, JR., ETAL  3,091,803
BLOW MOLDING APPARATUS
Filed Feb. 20, 1961  4 Sheets-Sheet 1

INVENTORS
J.N. SCOTT, JR.
D.L. ALEXANDER
D.L. PETERS
BY
ATTORNEYS

INVENTORS
J.N. SCOTT, JR.
D.L. ALEXANDER
D.L. PETERS

BY Hudson & Young

ATTORNEYS

INVENTORS
J. N. SCOTT, JR.
D. L. ALEXANDER
D. L. PETERS

ATTORNEYS

June 4, 1963 J. N. SCOTT, JR., ETAL 3,091,803
BLOW MOLDING APPARATUS
Filed Feb. 20, 1961 4 Sheets-Sheet 4

INVENTORS
J.N. SCOTT, JR.
D.L. ALEXANDER
D.L. PETERS
BY
Hudson & Young
ATTORNEYS

United States Patent Office 3,091,803
Patented June 4, 1963

3,091,803
BLOW MOLDING APPARATUS
John N. Scott, Jr., Doyle L. Alexander, and Don L. Peters, Bartlesville, Okla., assignors to Phillips Petroleum Company, a corporation of Delaware
Filed Feb. 20, 1961, Ser. No. 90,390
6 Claims. (Cl. 18—5)

This invention relates to apparatus for the manufacture of hollow articles from plastic materials such as polyethylene. The apparatus is particularly well adapted for forming large containers and can be used with conventional injection molding equipment.

Because blow molding of large containers ordinarily requires a considerable amount of apparatus and floor space many fabricators are not able to undertake this type of manufacture. It is highly desirable that apparatus be developed for this purpose which can be used with standard equipment such as injection molding machines which are available to most plastics fabricators.

According to our invention a unique bottle blowing mold is made available for use in combination with an injection molding machine. The bottle blowing mold of our invention can be employed to form large containers on relatively small equipment. In the mold of our invention considerable savings in space and moving parts has been achieved by using a conventional split mold and making one of the mold halves stationary. The apparatus of our invention comprises a parison die positioned for downward extrusion, a stationary mold half offset below said die, said stationary mold half being positioned clear of the path which is followed by the parison on extrusion, a movable mold half retractable from beneath said die and movable across the path of the parison to a closed position in registry with the stationary mold half, a mandrel positionable directly below said die to receive the lower portion of the extruded parison, said mandrel being movable with the movable mold half to a position between the closed mold halves, means for severing the parison at the die, means for gripping the upper portion of the severed parison above the mold halves, said gripping means being movable with said mandrel and said movable mold half to transport the severed parison to said stationary mold half and to remove the molded item from said stationary mold half on retraction of the movable mold half, and means for injecting a blowing fluid into the parison to form the molded item. In a preferred embodiment of the invention the movable mandrel is rotatable in a plane parallel to the parting faces of molds when the molds are in the open position to facilitate removal of the molded item.

It is an object of our invention to provide an improved blow molding apparatus. Another object of the invention is to provide a blow molding apparatus which can be used with conventional injection molding equipment to permit the formation of large plastic containers. Other objects, advantages and features of our invention will be apparent to those skilled in the art from the following discussion and drawings in which FIGURE 1 is an overall view of an injection molding machine with the apparatus of our invention in place;

Figure 1:
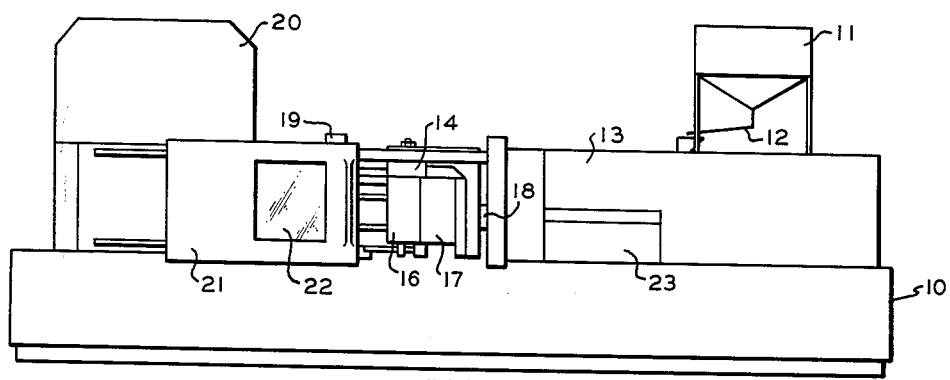

The apparatus of our invention can be used to mold containers such as bottles or buckets, decorative spheres, balls, and the like, from a variety of thermoplastic materials such as polyethylene, polypropylene, polystyrene polyvinyl chloride, and the like. While the apparatus can be incorporated into specially designed equipment it was developed for and finds its greatest utility in combination with conventional molding equipment. An illustration of how the apparatus of the invention is used in an injection molding machine is shown in FIGURE 1. The injection molding machine of FIGURE 1 has a base 10 and a storage hopper 11 for the granular polymer. The polymer is metered from hopper 11 through conveyor 12 and passes into plasticizing chamber 13. The molten polymer is then forced into the blow mold 14 of our invention.

In this blow mold, mold half 16 is movable while mold half 17 is stationary. The entry flange 18 of the blow molding apparatus 14 connects to the nozzle of the injection molding apparatus to receive the molten polymer. The mold half 16 is motivated by movable plate 19 of injection molding machine which is activated by hydraulic apparatus within housing 20. A safety shield 21 can be moved into position between the operator and the molding apparatus during operation. The movement of the apparatus can be viewed by the operator through window 22 while the conditions of the molding operation are regulated at control panel 23.

Figure 2:
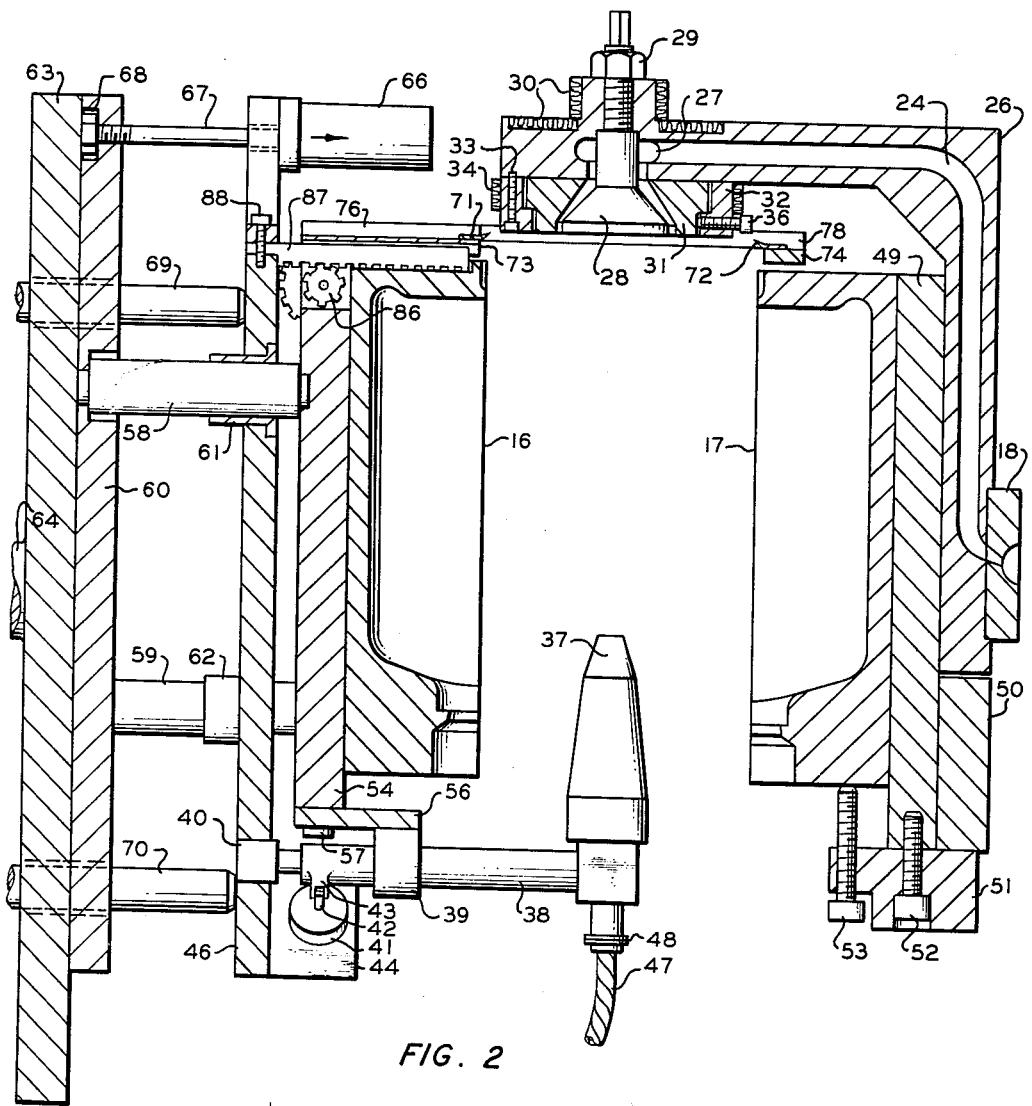
FIGURES 2, 3 and 4 are sectional views of the apparatus of our invention showing several positions of the mold during the molding cycle.

Referring now to FIGURE 2 a sectional detail of the molding apparatus of our invention will be described. As explained in connection with FIGURE 1, flange 18 connects to the nozzle of the injection molding machine so that the molten polymer from the plasticizing section of the injection molding machine is forced through channel 24 in runner 26 and passes into an annular chamber 27 about core 28. Core or mandrel 28 is held in position by nut 29 on the threaded upper end thereof. Band heaters 30 maintain the polymer in a molten condition. The orifice of the parison die which is positioned for vertical downward extrusion is formed by mandrel 28 and bushing 31. Bushing 31 is held in position by collar 32 which is fastened to the runner body by bolts 33, one of which is shown. Additional heat can be supplied about collar 32 by band heater 34. Bushing 31 can be positioned concentric or eccentric to core 28 by adjusting set screw 36. Normally several, for example, at least 3, set screws are provided so that the orifice formed between the mandrel and the bushing can be adjusted to provide a uniform wall in the parison as it is extruded. Such an adjustment is usually necessary when the path of polymer flow is longer for one section of the parison wall than for another. This is the case in the apparatus illustrated since the molten polymer enters from the side of annular chamber 27.

As the parison is extruded downward from the die, the open end thereof passes over mandrel 37. Mandrel 37 is pivotally supported by shaft 38 which in turn is held by collar 39 and mounted in socket 40. The rotation of mandrel 37 and shaft 38 is motivated by air cylinder 41 which is linked to shaft 38 by rod 42 and clevis 43. Air cylinder 41 is mounted on plate 44 which in turn is fixed to ejector plate 46. Socket 40 into which shaft 38 is pivotally mounted is also fastened in ejector plate 46. The pivoting movement of mandrel 37 is further shown in FIGURE 6 which is a view at right angles to the view in FIGURE 2. At the proper time in the molding cycle, by the motivation of air cylinder 41 mandrel 37 is caused to rotate outwardly from between the mold halves about 45 to 60 degrees. The molded item which has been pulled free of the mold halves is carried by mandrel 37 and can then be easily removed by hand. With the exception of this pivoting movement mandrel 37 is rigidly fixed to ejector plate 46; therefore, a transverse movement of ejector plate 46 causes movement of mandrel 37. This movement is important in coordinating the motion of the mandrel with that of the other portions of the molding apparatus during operation. Mandrel 37 is supplied with blowing air by air hose 47 which is connected to the mandrel through coupling 48.

Stationary mold half 17 is mounted on platen 49 which ordinarily contains cooling channels, not shown. Platen 49 is in turn mounted on plate 50 and runner 26 which are mounted in stationary position within the injection molding apparatus as shown in FIGURE 1. Adjusting bar 51 is mounted to the bottom of platen 49 with bolt 52 and holds set screw 53 which can be used to adjust the height of mold half 17 in order to obtain accurate registry with mold half 16.

Movable mold half 16 is supported by platen 54 to which it is rigidly attached. Arm 56 is fastened to platen 54 by bolt 57 and supports collar 39 in which shaft 38 of the mandrel is slidably mounted. Platen 54 is rigidly mounted by shafts 58 and 59 to support plate 60. Ejector plate 46 is disposed parallel to and between support plate 60 and platen 54 and is slidably supported on shafts 58 and 59 which pass through collars 61 and 62, respectively, in ejector plate 46. While two of these supporting shafts have been shown, three or more can be used or a single heavy shaft could be employed if desired. Support plate 60 which is a part of the apparatus of our invention can be mounted on carrier 63 which is connected to hydraulic ram 64. Ordinarily carrier 63 is a permanent member of the injection molding apparatus. In FIGURE 1 carrier 63 and supporting plate 60 have been shown together as movable plate 19.

Ejector plate 46 is biased toward support plate 60 by air cylinder 66 mounted on ejector plate 46 and connected to support plate 60 through rod 67 by nut 68. Air pressure is supplied to air cylinder 66 forcing the piston thereof in the direction shown by the arrow on air cylinder 66. The air pressure tends to retract rod 67 within the air cylinder and this in turn forces ejector plate 46 toward support plate 60. Ordinarily, two or more of these air cylinders are employed. Use of such biasing means positioned on diagonally opposite corners of the ejector plate are satisfactory. Other biasing means such as a coil spring mounted between platen 54 and ejector plate 46 could be used in place of the air cylinders shown.

Figure 3:
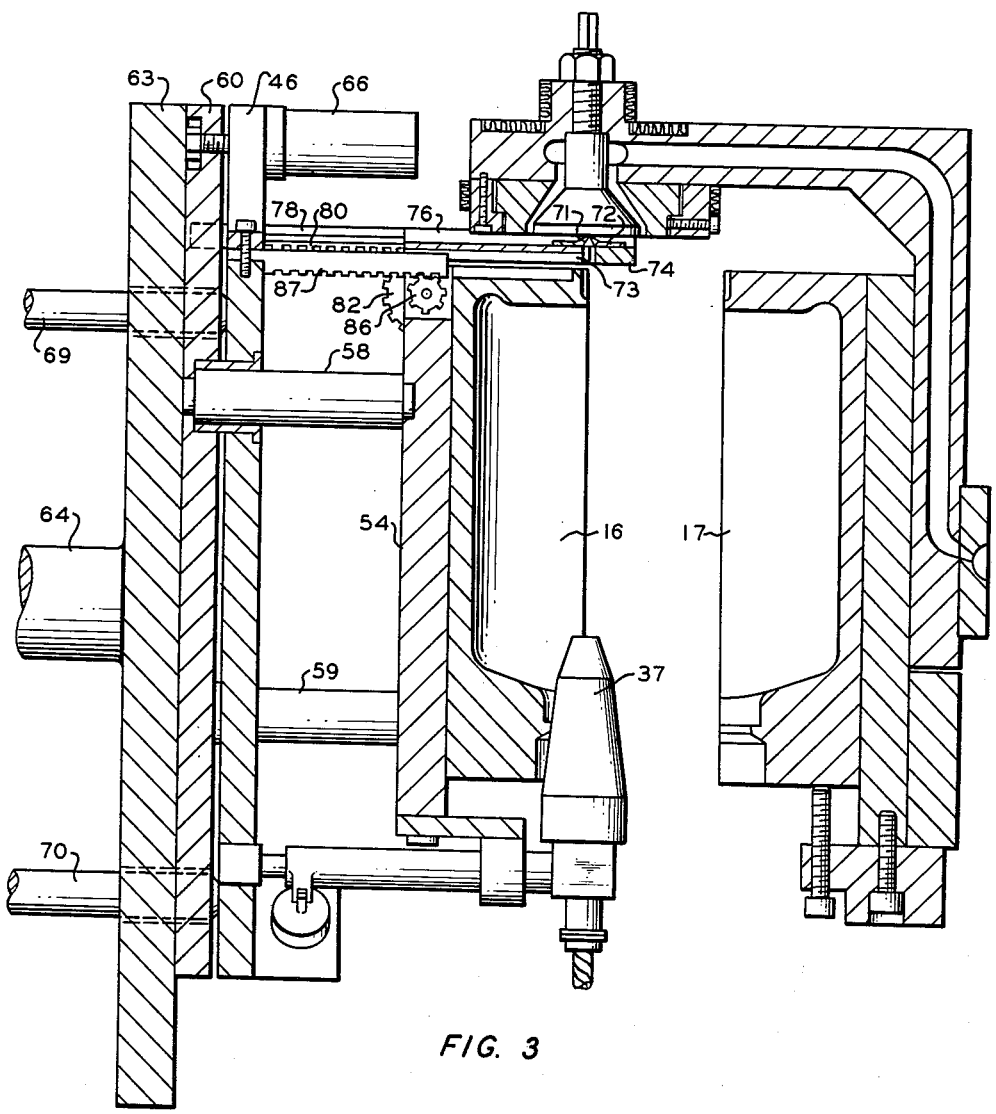
Figure 4:
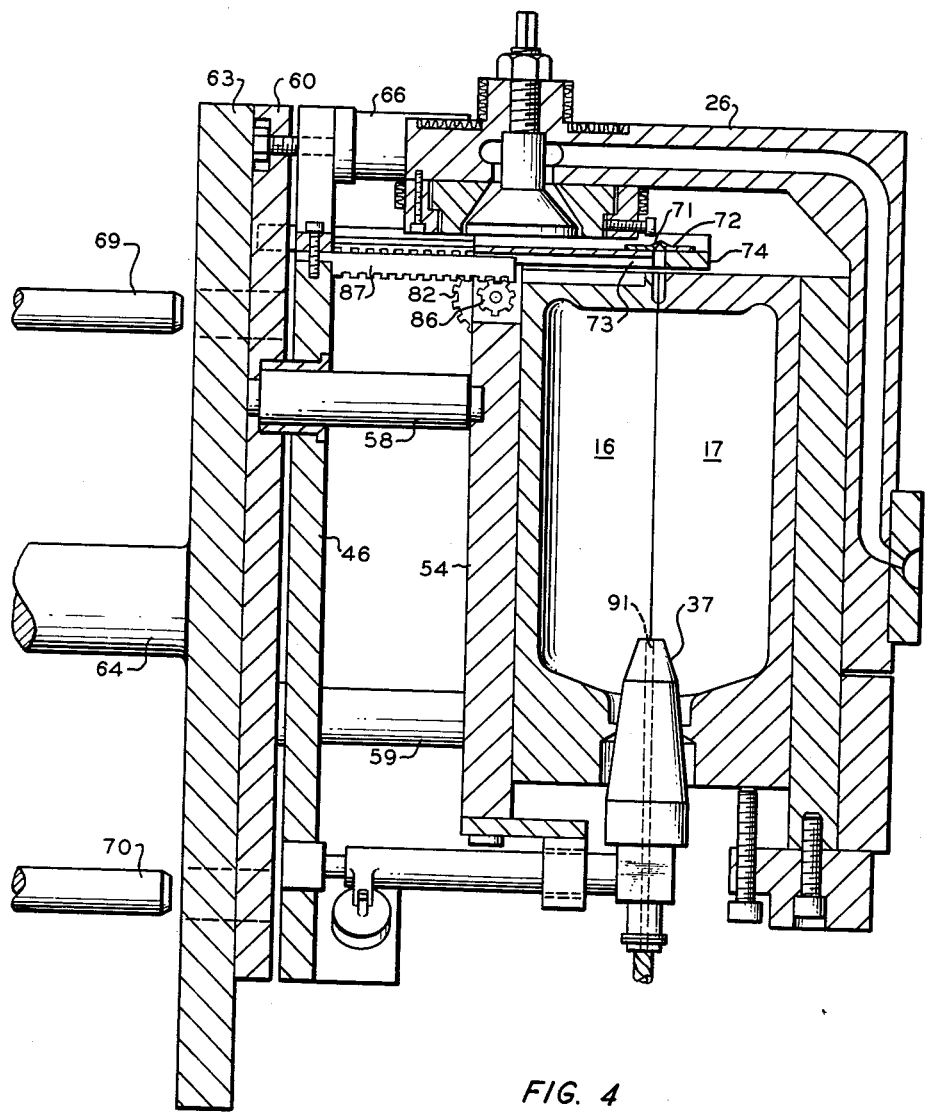

When the movable mold and the support plate are in the open position as shown in FIGURE 2, ejector plate 46 is restrained from approaching support plate 60 by pins 69 and 70. Here again conventional features of an injection molding machine can be used to advantage since knockout pins of this type are ordinarily provided. Pins 69 and 70 are stationary and pass through apertures in carrier 63 and support plate 60. As carrier 63 with support plate 60 is moved forward, toward the stationary mold half, ejector plate 46 remains stationary because of the biasing action of air cylinder 66 until support plate 60 contacts ejector plate 46 in the semiclosed position as shown in FIGURE 3. Movable mold half 16 when in this position is directly under the parison die with its parting face on the center line of the die and the extruded parison. Since ejector plate 46 has remained stationary up to this point, mandrel 37 has likewise remained stationary and is shown in FIGURE 3 positioned adjacent movable mold half 16. As carrier 63 continues forward movable mold half 16 continues to close and support plate 60, platen 54, mold half 16, ejector plate 46, and mandrel 37 all move forward simultaneously until the mold is closed as shown in FIGURE 4.

An important feature of the invention which acts in cooperation with the other elements above described is the cutting and gripping means which is activated by the relative movement between platen 54 and ejector plate 46. In the operation of these features, after the parison has been extruded the desired length and mold half 16 begins to close, knife blades sever the parison and the severed end of the parison is gripped and held in position adjacent the movable mold half while the mold half and the parison together are transferred to the stationary mold half 17. Referring again to FIGURE 2, there are shown knife blades 71 and 72 which are oppositely disposed on either side of the path of the extruded parison. These knife blades are oriented to bear against the face of the parison die and as they are moved across the orifice of the die they sever the parison from the plastic material which has not left the die. Knife blade 71 is mounted on pinch plate 73 and knife blade 72 is mounted on pinch bar 74. The details of this apparatus can better be understood by referring to FIGURE 5 which shows a perspective view of the cutting and gripping mechanism.

Figure 5:
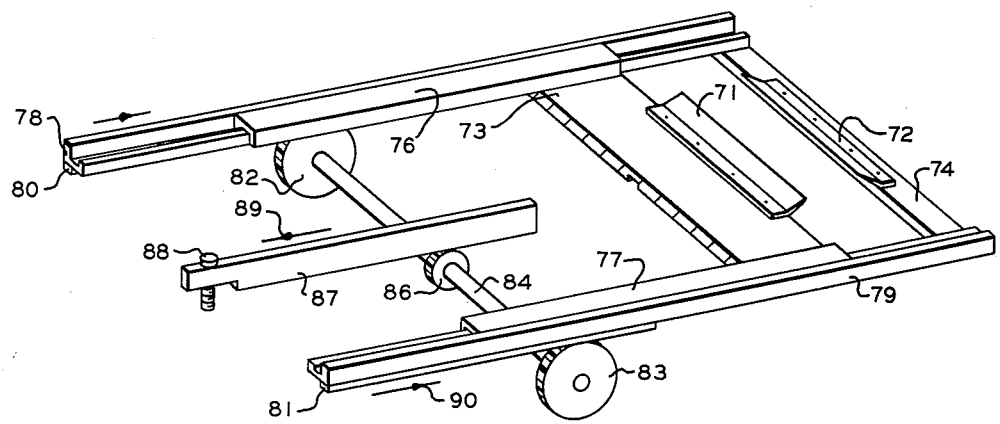
FIGURE 5 is a perspective view of the parison cutting and gripping mechanism.

In FIGURE 5 a portion of pinch plate 73 has been cut away for the sake of clarity. Tracks 76 and 77 are mounted on the upper face on each side of pinch plate 73. Rails 78 and 79 support pinch bar 74 and are slidably mounted within tracks 76 and 77, respectively. These rails extend from pinch bar 74 on either side of the parison die back to platen 54. Racks 80 and 81 are mounted on the lower edges of rails 78 and 79, respectively. Pinion 82 engages teeth on rack 80 and pinion 83 engages rack 81. These pinions 82 and 83 are mounted on either side of platen 54 and are connected by a shaft 84 which runs through the top of said platen. A small pinion 86 is mounted on shaft 84 in a slot within the center of platen 54. Pinion 86 engages rack 87 one end of which is attached by bolt 88 to the center at the upper end of ejector plate 46. Rack 87 extends through the slot in platen 54 and along a keyway which is formed by matching grooves in the lower face of pinch plate 73 and the upper end of mold half 16. Pinions 82 and 83 have twice the diameter of pinion 86.

The relative movement between platen 54 and ejector plate 46 causes rack 87 to rotate pinion 86 which in turn rotates shaft 84 and pinions 82 and 83 located at the extremities thereof. The rotation of pinions 82 and 83 results in the linear travel of racks 80 and 81 and of rails 78 and 79 to which said racks are fixed. FIGURE 5 shows a position in which the pinch blade and pinch bar are just beginning to open after an item has been molded and removed from stationary mold half 17. Mold half 16 has been retracted from its closed position with stationary mold half 17 and has reached the position centrally located under the parison die as shown in FIGURE 3. At this point ejector plate 46 strikes pins 69 and 70 and ceases to move with support plate 60. Platen 54 continues to move with support plate 60, however, and the movement of platen 54 in the direction as shown by arrow 89 causes rack 87 to rotate pinion 86 in a clockwise direction. This in turn causes rails 78 and 79 to move in the direction indicated by arrows 90. Pinch plate 73 and knife blade 71 being attached to platen 54 continue to move in the direction indicated by arrow 89, while pinch bar 74 and knife blade 72 being attached to rails 78 and 79 travel in the direction indicated by the arrows 90. The knife blades and pinch members are thereby opened to release the molded item and ultimately achieve the open position shown in FIGURE 2.

When platen 54 and mold half 16 are moved forward from the open position toward stationary mold half 17, ejector plate 46 remains stationary as previously described. This produces a relative movement between ejector plate 46 and platen 54 so that rack 87 rotates pinion 86 in a counter-clockwise direction. Rails 78 and 79 with pinch bar 74 and knife blade 72 are drawn toward the parison which has been extruded. Because pinions 82 and 83 have twice the diameter of pinion 86 the relative movement between knife blades 72 and 71 is twice the relative movement between platen 54 and ejector plate 46. The knife blades and pinch members are, therefore, drawn together severing the parison and gripping the severed portion of the parison between the pinch members in the position shown in FIGURE 3. At this point ejector plate 46 is contacted by support plate 60 and moved forward with plate 60 so that there is no longer relative movement between platen 54 and ejector plate 46; therefore the closed knife blades and pinch members move together with mold half 16 and mandrel 37 to the closed position with stationary mold half 17. Pinch members 73 and 74 together with mandrel 37 hold the parison in position next to mold half 16 and the parison is transferred to the molding position in stationary mold half 17. After the mold halves close as shown in FIGURE 4, air or other blowing fluid is injected into the parison through channel 91 in mandrel 37. The air pressure forces the soft parison out against the walls of mold halves 16 and 17 thereby forming the container.

Figure 6:
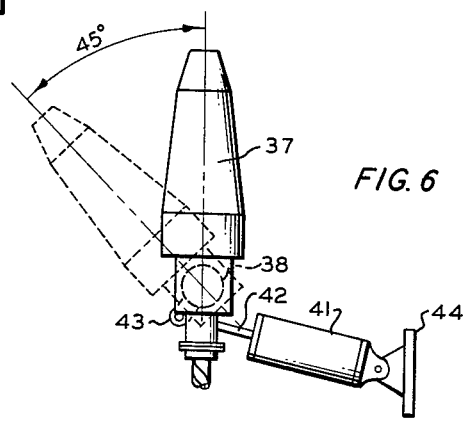
FIGURE 6 illustrates the movement of the pivotal mandrel to facilitate removal of the molded item from between the mold halves.

Pressure is maintained on the mold halves by ram 64 during the blowing portion of the cycle. After the bottle has been molded this pressure is released and ram 64 moves carrier 63 backward, thereby withdrawing mold half 16 with support plate 60. Ejector plate 46 also moves back with support plate 60 because of the biasing action of air cylinder 66. In this stage no relative movement occurs between platen 54 and ejector plate 46 so that mandrel 37 with pinch members 73 and 74 are moved away from stationary mold half 17 with movable mold half 16, thereby withdrawing the molded item from mold half 17. When mold half 16 reaches the center position under the parison die, ejector plate 46 contacts pins 69 and 70 and stops moving. Mandrel 37 also ceases to move, as previously described. The continued retraction of carrier 63 moving support plate 60 and platen 54 creates relative movement between platen 54 and ejector plate 46 resulting in the opening of pinch members 73 and 74. The molded item is retained on mandrel 37 and thereby withdrawn from mold half 16. When mold half 16 reaches the open position shown in FIGURE 2 mandrel 37 is rotated as shown in FIGURE 6 and the molded item can be readily removed.

The cooperative movement of the pinch members 73 and 74 with mandrel 37 support the severed parison as it is being transferred from its extruded position to its molding position in stationary mold half 17. By the use of these members for transferring the extruding parison, only one mold half need be movable. This results in substantial savings of equipment and space. These pinch members and mandrel also cooperate to aid in removing the molded item from the stationary mold half, and after the movable mold half reaches center position the mandrel serves to remove the molded item from the movable mold half while the pinch members release the severed end of the parison. The pinch members retract to permit easy removal of the molded item from between the mold halves while at the same time clearing the path for extrusion of another parison.

As will be apparent to those skilled in the art various modifications can be made in our invention without departing from the scope thereof.

We claim:

1. Apparatus for blow molding comprising a parison die positioned for downward extrusion along a path about the die center line, a stationary mold half offset below said die, clear of the path followed by the parison being extruded, a movable mold half retractable from beneath said die and movable across the path of the parison to a closed position in registry with said stationary mold half, a mandrel positionable directly below said die to receive the lower portion of the extruded parison and movable with said movable mold half to a position between the closed mold halves, means for severing the parison at the die, means for gripping the upper portion of the severed parison above said mold halves, said severing means and gripping means comprising two cutting and pinching members positionable on opposite sides of the extruded parison and linked mechanically to approach simultaneously coming together at said center line, said gripping means being movable with said mandrel and said movable mold half to transport the severed parison to said stationary mold half and to remove the molded item from said stationary mold half on retraction of the movable mold half, and means for injecting fluid through said mandrel into the parison to mold same.

2. Apparatus for blow molding comprising a parison die positioned for vertical downward extrusion of a parison along a path about the die center line, a stationary mold half offset below said die clear of the path followed by the parison being extruded, a movable mold half having an open position on the opposite side of said parison path from said stationary mold half, a center position in which the parting face of said movable mold half lies along the center line of said parison die and parison, and a closed position in registry with said stationary mold half, a mandrel vertically disposed below said die at the lower end of said mold halves, said mandrel having a first position directly below said die on the center line thereof to receive the extruded parison and a second position between the closed mold halves, means for advancing said movable mold half from said open position through said center position to said closed position and retracting same to said open position, means for severing the extended parison as said movable mold half is advanced from said open position to said center position, means for gripping the severed end of the parison and transferring same with said movable mold half as it is advanced from said center position to said closed position, said severing means and gripping means comprising two cutting and pinching members positionable on opposite sides of the extruded parison and linked mechanically to approach simultaneously coming together at said center line, means for admitting blowing fluid into the parison when said mold halves are closed, means for moving said gripping means engaging said parison end with said movable mold half as it is retracted from said closed position to said center position, means for moving said mandrel from said second position to said first position as said movable mold half is retracted to said open position, and means for disengaging said gripping means from the parison end as said movable mold half is retracted from said center position to said open position.

3. Apparatus according to claim 2 comprising means for rotating said mandrel in a plane parallel to the parting faces of said mold halves when said mandrel is in said first position and said movable mold half is in said open position.

4. Apparatus suitable for use in an injection molding machine for blow molding large containers comprising a parison die positioned for vertical downward extrusion, a stationary first mold half offset below said die clear of the path followed by the parison being extruded, a second mold half retractable to an open position offset below said die and movable across said parison path to a closed position in registry with said first mold half, said mold halves being oriented to close about said parison and being equidistant from said path when said movable mold half is in said open position, a movable platen supporting said second mold half, a movable support plate spaced behind and parallel to said platen and supporting said platen through a plurality of connecting shafts, an ejector plate disposed parallel to and between said platen and support plate and slidably supported on said connecting shafts, means for biasing said ejector plate toward said support plate, said ejector plate being restrained from approaching said support plate in the open position by a plurality of stationary pins extending freely through said support plate, a vertical mandrel disposed in the open position directly below said die to receive the lower portion of the extruded parison, said mandrel having a central bore for injection of blowing air into the parison, a shaft pivotally connecting the lower portions of said mandrel and said ejector plate, means for rotating said mandrel in a plane parallel to said platen when said second mold half reaches open position, a first knife and pinch member fastened to the upper end of said second mold half at the parting face, a second knife and pinch member movably disposed on the opposite side of the parison path, and linking means transmitting the relative movement between said ejector plate and said platen to move said second knife and pinch member to and from engagement with said first knife and pinch member, said pinch members serving to grip the upper end of the parison after it has been severed by said knives and hold said severed parison as it is transferred with said second mold half and mandrel to molding position with said stationary mold half.

5. Apparatus suitable for use in an injection molding machine for blow molding large containers comprising a parison die positioned for vertical downward extrusion, said die having an annular channel formed between a stationary core and an adjustable outer bushing, the lower surfaces of said core and bushing forming the die face, a runner containing a channel communicating at one end with said annular channel and connectable at its other end with the nozzle of an injection molding machine, a stationary first mold half offset below said die clear of the path followed by the parison being extruded, a second mold half retractable to an open position offset below said die and movable across said parison path to a closed position in registry with said first mold half, said mold halves being oriented to close about said parison and being equidistant from said path when said movable mold half is in said open position, a movable platen supporting said second mold half, a support plate spaced behind and parallel to said platen and supporting said platen through a plurality of connecting shafts, said support plate being connectable to a power motivated carrier on said injection molding machine, an ejector plate disposed parallel to and between said platen and support plate and slidably supported on said connecting shafts, a plurality of air cylinders biasing said ejector plate toward said support plate, said ejector plate being restrained from approaching said support plate in the open position by a plurality of knock-out pins of the injection molding machine, said pins in operation being stationary and extending freely through said carrier and support plate, a vertical mandrel disposed in the open position directly below said die to receive the lower portion of the extruded parison, said mandrel having a central bore for injection of blowing air into the parison, a shaft pivotally connecting the lower portions of said mandrel and said ejector plate, an air cylinder and rod connected to said mandrel shaft for actuating said mandrel in about a 55 degree rotation when said second mold half reaches open position, a horizontal pinch plate fastened to said platen directly above said second die half, the leading edge of said pinch plate contacting the parison when said second mold is closed, a first knife blade fixed to the upper side at the leading edge of said pinch plate, a pinch bar and second knife blade similarly disposed on the opposite side of the parison path, the leading edges of said pinch plate and pinch bar serving to grip the upper end of the parison as said first and second knife blades sever same against said die face, a pair of rails supporting the ends of said pinch bar and extending to said platen, a pair of tracks slidably engaging said rails and fastened along each side of the upper face of said pinch plate, a pair of racks on the lower edges of said rails, a center rack fastened at one end to said ejector plate and extending through a slot in said platen and along a keyway formed by mating central grooves in the lower face of said pinch plate and the top of said second mold half, and one center and two outer pinions mounted on a shaft extending through the upper end of said platen, the center pinion mounted in said slot and engaging said center rack and the two outer pinions mounted on either side of said platen and each engaging a rack on one of said rails, the diameters of said outer pinions being twice the diameter of said center pinion, the movement of said second knife blade and pinch bar to and from engagement with said first knife blade and pinch plate being prompted by relative movement between said platen and ejector plate and said pinch plate and pinch bar traveling together with said second mold half and mandrel to and from closed position with said stationary first mold half.

6. In apparatus for blow molding which includes a parison die positioned for downward extrusion along a path about the die center line, molding means offset below said die clear of the path followed by the parison being extruded, and means for severing and transporting the extruded parison to said molding means, the improvement comprising, in combination, first cutting and pinching means positionable on one side of the parison extrusion path, second cutting and pinching means positionable on the opposite side of said path, means linking said first and second cutting and pinching means to advance same simultaneously toward said center line cutting the upper end of the parison and gripping the severed end thereof when in a closed position at said center line, means for moving said first and second pinching means in closed position from said center line to said molding means and from said molding means back to said center line, and means for parting said first and second pinching means upon reaching said center line and positioning same on opposite sides of said parison path.

References Cited in the file of this patent

UNITED STATES PATENTS

| | | |
|---|---|---|
| 2,783,503 | Sherman | Mar. 5, 1957 |
| 2,898,633 | Burch | Aug. 11, 1959 |
| 2,978,745 | Langecker | Apr. 11, 1961 |
| 3,009,198 | Kalman et al. | Nov. 21, 1961 |

FOREIGN PATENTS

| | | |
|---|---|---|
| 1,109,688 | France | Jan. 31, 1956 |
| 203,385 | Australia | Sept. 27, 1956 |
| 789,816 | Great Britain | Jan. 29, 1958 |
| 1,249,682 | France | Nov. 21, 1960 |